W. J. KNOX.
SIDE BEARING FOR RAILWAY CARS.
APPLICATION FILED JUNE 21, 1919.

1,387,852.

Patented Aug. 16, 1921.
2 SHEETS—SHEET 1.

INVENTOR
Wm. J. Knox
by James C. Bradley
ATTORNEYS

W. J. KNOX.
SIDE BEARING FOR RAILWAY CARS.
APPLICATION FILED JUNE 21, 1919.
1,387,852.
Patented Aug. 16, 1921.
2 SHEETS—SHEET 2.
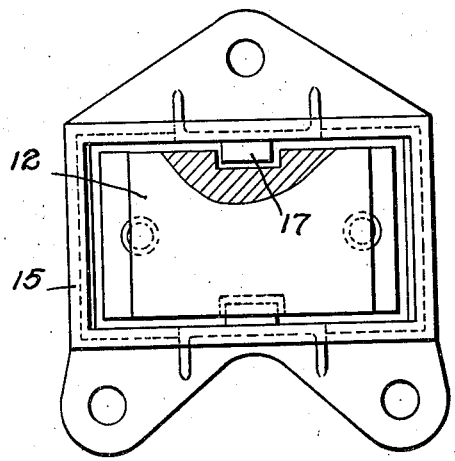
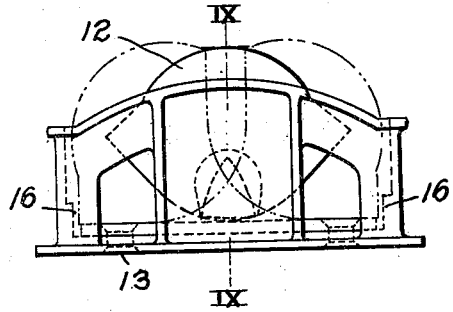
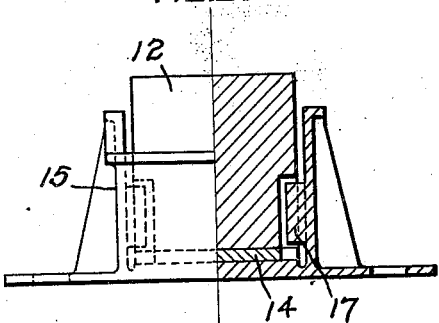
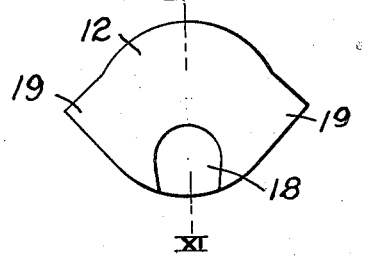
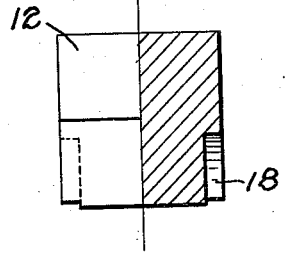
INVENTOR
Wm J. Knox
by
James C. Bradley
ATTORNEYS

UNITED STATES PATENT OFFICE.

WILLIAM J. KNOX, OF DUBOIS, PENNSYLVANIA.

SIDE BEARING FOR RAILWAY-CARS.

1,387,852.  Specification of Letters Patent.  Patented Aug. 16, 1921.

Application filed June 21, 1919. Serial No. 305,859.

*To all whom it may concern:*

Be it known that I, WILLIAM J. KNOX, a citizen of the United States, and a resident of the city of Dubois, in the county of Clearfield and State of Pennsylvania, have made a new and useful Invention in Side Bearings for Railway-Cars, of which the following is a specification.

Figure 1:
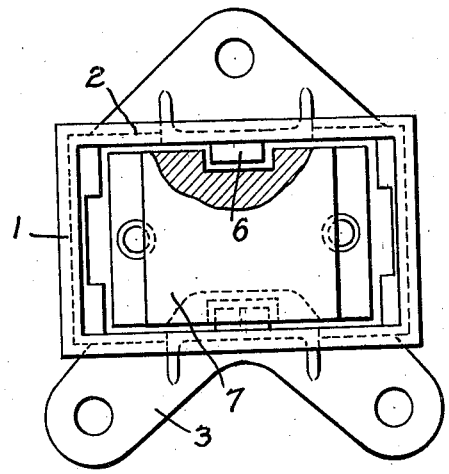
Figure 6:
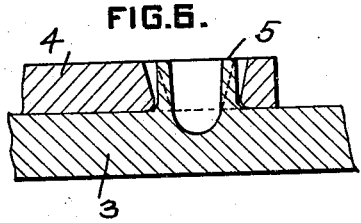
Figure 2:
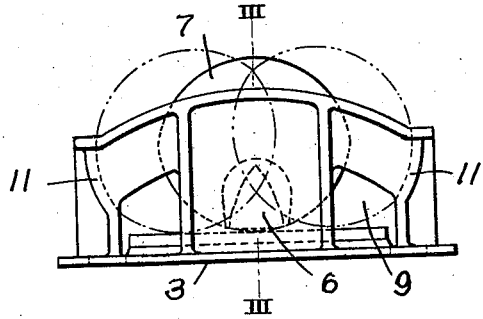
Figure 3:
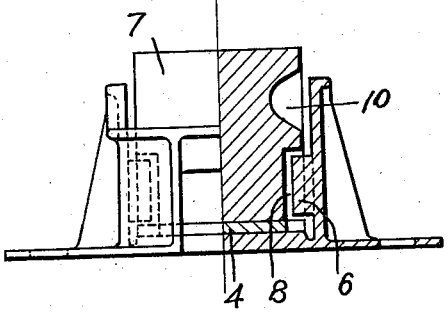
Figure 4:
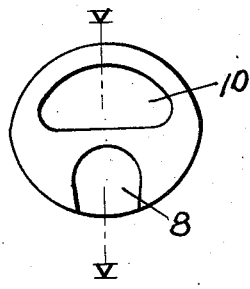
Figure 5:
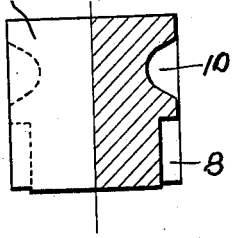

The invention relates to side bearings for cars; and has for its principal object the provision of a form of side bearing having; (1) improved and simplified means for preventing the roller employed being displaced laterally upon its bearing plate; (2) improved means for securing the bearing plate, upon which the roller rests, in position; (3) improved means for overweighting the roller and limiting its lateral movement. A further object of the invention is to provide a bearing of strong durable construction having a minimum number of parts of ample strength to sustain the heaviest loads and to permit the car body and truck to move freely when passing curves, and so arranged that the rollers will automatically return to normal position when relieved of the load. Certain embodiments of the invention are illustrated in the accompanying drawings wherein;

Figure 1 is a plan view of the bearing with one end of the roller broken away to show the centering pin. Fig. 2 is a side elevation of the bearing with the roller shown in central position in full lines and in extreme travel positions in dot and dash lines. Fig. 3 is a half end view and a half section taken on the line III—III of Fig. 2. Fig. 4 is an end elevation of the roller removed from the cage. Fig. 5 is a half side elevation and half section of the roller taken on the center line V—V of Fig. 4. Fig. 6 is a partial section showing the particular method of securing the bearing plate to the cage. Fig. 7 is a plan view similar to that of Fig. 1 of a modification, and Figs. 8, 9, 10 and 11 are views of the modification of Fig. 7 corresponding to the views of Figs. 2, 3, 4 and 5, the partial section of Fig. 9 being taken on the line IX—IX of Fig. 8 and that of Fig. 11 being taken on the line XI—XI of Fig. 10.

Referring first to the construction of Figs. 1 to 6, 1 is the cage of rectangular form having the side walls 2 suitably stiffened by the ribs illustrated and mounted upon the base plate 3 adapted to be secured to the truck bolster. Mounted inside the cage is a bearing plate 4, which may be held in position by any suitable means, such as rivets or the like, or by means of the particular securing means shown in Fig. 6. This means comprises the hollow lugs 5 extending upward from the base plate and lying within the tapered recesses in the bearing plate 4. The hollow lugs are expanded to fit the tapering recesses and serve to hold the bearing plate very securely in position.

The side walls 2 of the cage are provided with inwardly projecting centering pins 6 of the triangular shape indicated in Fig. 2. A bearing roller 7 lies in the cage and has its ends provided with recesses 8 extending inward radially from the periphery, such recesses receiving the centering pins as indicated in Figs. 1 and 3. These recesses are shaped as indicated in Figs. 2 and 4, so that the roller can roll laterally to the extreme positions indicated in dot and dash lines in Fig. 2 without interference from the centering pins. On the other hand the centering pins prevent the roller from sliding longitudinally of the cage. The roller is overweighted or balanced as hereafter described so that it will always return by gravity to the central position indicated in full lines in Fig. 2 when released from its load. Perforations 9 are provided in the side walls of the cage (Fig. 2) to permit the escape of dirt or stones which would tend to interfere with the free movement of the roller upon the bearing plate.

The roller is preferably lightened above its center by the recesses 10 which tend to make the roller automatically assume the position of Fig. 4 when relieved of its load, since the center of gravity is lowered by this expedient to a point below the horizontal center line of the roller. This effect is further promoted by shaping the roller in the approximate form of an ellipse or flattened circle, instead of a true circle, since any movement of the roller from the position of Fig. 2 raises its center of gravity. This elliptical form has a further advantage as the distance of the top bearing surface of the roller from the bottom bearing surface increases as the roller moves from its central position, this compensating for the increased compression of the springs as the roller moves off center, and assisting the car to level up after passing a curve.

When the roller reaches its extreme positions as indicated in the dot and dash lines of Fig. 2, it takes again the curved surfaces 11 on the end walls of the cage, such surfaces acting as stops and preventing further movement of the roller and relieving the centering pins of any thrust from the roller.

Figs. 7 to 11 illustrate a modified form of device, which follows that of Figs. 1 to 6 except as to the shape of the roller 12 and the feature of securing the bearing plate 14 in position by ordinary rivets 13 instead of by the use of the hollow lugs 5 of Fig. 6. The cage 15 is similar to that of Figs. 1 to 3 except as to the end walls which are modified in contour and provided with the stops 16 (Fig. 8) to engage the pointed ends of the roller when it reaches the extreme positions shown in dot and dash lines in Fig. 8, such engagement relieving the centering pins of any possible thrust. The centering pins 17 correspond to those of Figs. 1 to 5 and the recesses 18 in the roller are also similar to those of Figs. 1 to 5.

The overweighting or balancing of the roller so that it will automatically return to normal position is secured by the use of the pointed extensions 19, the lower sides of which engage the bearing plate and stop the movement of the roller when it reaches the extreme positions illustrated in Fig. 8.

What I claim is:

1. In combination in a side bearing, a cage having side walls, centering pins projecting inwardly from said walls, a roller in the cage having its end walls provided with recesses extending radially from the periphery of the roller inward, and stops at the end of the cage for limiting the movement of the roller, the clearance between the centering pins and the sides of the recesses being such as to permit the roller to move to engagement with the stops without interference by the centering pins.

2. In combination in a side bearing, a cage having side walls, centering pins projecting inwardly from said walls, a roller in the cage having its end walls provided with recesses extending radially from the periphery of the roller inward, and stops for limiting the movement of the roller longitudinally of the cage, said pins being approximately triangular in vertical cross section, with clearance in the recesses such as to permit the roller to move to engagement with the stops without interference by the centering pins.

3. In combination in a side bearing, a cage having side walls, centering pins projecting inwardly from said walls, and a roller in the cage having its end walls provided with recesses extending radially from the periphery of the roller inward, the said roller when in central position having its horizontal axis greater than its vertical axis whereby the roller is overweighted and tends to return to its position central of the cage, and the contour of the roller being such that the distance through the roller in a vertical plane is increased as the roller is moved laterally from its central position.

4. In combination in a side bearing, a cage, a roller in the cage having its horizontal axis, when in central position, greater than its vertical axis, and interengaging means on the roller and cage whereby the roller is prevented from sliding longitudinally of the cage, the contour of the roller being such that the distance through the roller in a vertical plane is increased as the roller is moved laterally from its central position.

5. In combination in a side bearing, a cage, a roller in the cage having the cross section of a flattened circle, positioned in the cage with its long axis horizontal when the roller is at the center of the cage, a substantially flat surface upon which the roller is supported and coöperating centering means on the cage and roller for preventing the roller from sliding longitudinally of the cage.

6. In combination in a side bearing, a cage having side walls, centering pins projecting inwardly from said walls, and a roller in the cage having its end walls provided with recesses extending radially from the periphery of the roller inward, said roller being recessed in its upper portion to secure an overweighting thereof, and the contour of the roller being such that the distance through the roller in a vertical plane is increased as the roller is moved laterally from its central position.

7. In combination in a side bearing, a cage having a bottom plate provided with inwardly projecting hollow lugs, and a bearing plate provided with perforations increasing in size upwardly in which the lugs fit, said lugs being expanded to secure the bearing plate to the bottom plate and coming substantially flush with the top of the bearing plate when expanded.

8. In combination in a side bearing, a cage having a bottom plate provided with inwardly projecting hollow lugs, and a bearing plate provided with tapering perforations receiving said lugs and in which the lugs are expanded to secure the bearing plate to the bottom plate and coming substantially flush with the top of the bearing plate when expanded.

9. In combination in a side bearing, a cage, a roller in the cage, the horizontal axis of the roller when in central position being greater than the vertical axis, and the contact or bearing faces of said roller being formed on curves with radii greater than half the vertical axis, and a substantially flat bearing surface upon which the roller is supported.

10. In combination in a side bearing, a cage having a bottom plate provided with inwardly projecting hollow lugs, and a bearing plate provided with perforations in which the lugs fit, said lugs being expanded to secure the bearing plate to the bottom plate and coming substantially flush with the top of the bearing plate when expanded.

In testimony whereof, I have hereunto subscribed my name this 16th day of June, 1919.

WILLIAM J. KNOX.

Witnesses:
 HAROLD D. ROPER,
 JOSEPH M. BISS.